(12) United States Patent
Draluk et al.

(10) Patent No.: US 9,009,856 B2
(45) Date of Patent: Apr. 14, 2015

(54) PROTECTED APPLICATION PROGRAMMING INTERFACES

(75) Inventors: Vadim Draluk, Cupertino, CA (US); Francois Goldfain, Sunnyvale, CA (US); Jan-Willem Maarse, Palo Alto, CA (US); Helen Bragg, Scotts Valley, CA (US); Sean Xiao, Beijing (CN)

(73) Assignee: Dell Products L.P., Round Rock, TX (US)

( * ) Notice: Subject to any disclaimer, the term of this patent is extended or adjusted under 35 U.S.C. 154(b) by 150 days.

(21) Appl. No.: 13/328,913

(22) Filed: Dec. 16, 2011

(65) Prior Publication Data

US 2013/0160147 A1    Jun. 20, 2013

(51) Int. Cl.
*G06F 9/445* (2006.01)
*G06F 21/51* (2013.01)

(52) U.S. Cl.
CPC ..................................... *G06F 21/51* (2013.01)

(58) Field of Classification Search
CPC ....................................................... G06F 21/51
USPC .................. 380/30, 51, 54, 243, 246; 726/30
See application file for complete search history.

(56) References Cited

U.S. PATENT DOCUMENTS

| 8,321,921 | B1 * | 11/2012 | Ahmed et al. | 726/7 |
| 8,375,458 | B2 * | 2/2013 | Kiehtreiber | 726/30 |
| 2006/0143179 | A1 * | 6/2006 | Draluk et al. | 707/9 |
| 2008/0005560 | A1 * | 1/2008 | Duffus et al. | 713/164 |

OTHER PUBLICATIONS

Liu et al. "Exploitation and Threat Analysis of Open Mobile Devices", ANCS'09 Oct. 19-20, 2009, pp. 20-29.*
"Java Security Domains", [Online]. Retrieved from the Internet: <URL: http://www.developer.nokia.com/Community/Wiki/Java_Security_Domains>, 3 pgs., Accessed Nov. 29, 2011.

* cited by examiner

*Primary Examiner* — Saleh Najjar
*Assistant Examiner* — Oleg Korsak
(74) *Attorney, Agent, or Firm* — Kwan & Olynick LLP

(57) ABSTRACT

Mechanisms are provided to allow particular parties and applications access to protected application programming interfaces (APIs) without the use of security domains. Trusted parties and applications may have access to protected APIs while unfrosted parties and applications may be restricted to a more limited set of APIs. Public keys associated with individual applications that are used to enforce licensing policies can be repurposed for use in a verification process to prevent unauthorized access to APIs. A credential storage manager can be used to maintain permission and certificate information. An application authorization manager may access credential storage and maintain trusted application information.

20 Claims, 6 Drawing Sheets

PROTECTED APPLICATION PROGRAMMING INTERFACES

TECHNICAL FIELD

The present disclosure relates to protected application programming interfaces.

DESCRIPTION OF RELATED ART

Many software platforms provide application programming interfaces (APIs) to developers to allow interaction between developer level processes and platform level processes. Some of these APIs may allow access to networking interfaces, user data, location information, hardware resources, etc. In many software platforms, it is desirable to provide different levels of access to these APIs. For example, some trusted applications may be permitted access to a full set of APIs while other third party applications may be permitted access to a limited set of APIs.

Conventional software platforms have the construct of security domains that are associated with particular parties and APIs. There may be a trusted third party domain, an untrusted third party domain, an operator domain, a service provider domain, etc. Particular parties have access to particular APIs in their corresponding domains. However, domains have limitations. Furthermore, some platforms do not use the domain construct. Consequently, it is desirable to provide additional mechanisms for protecting APIs.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Figure 1:
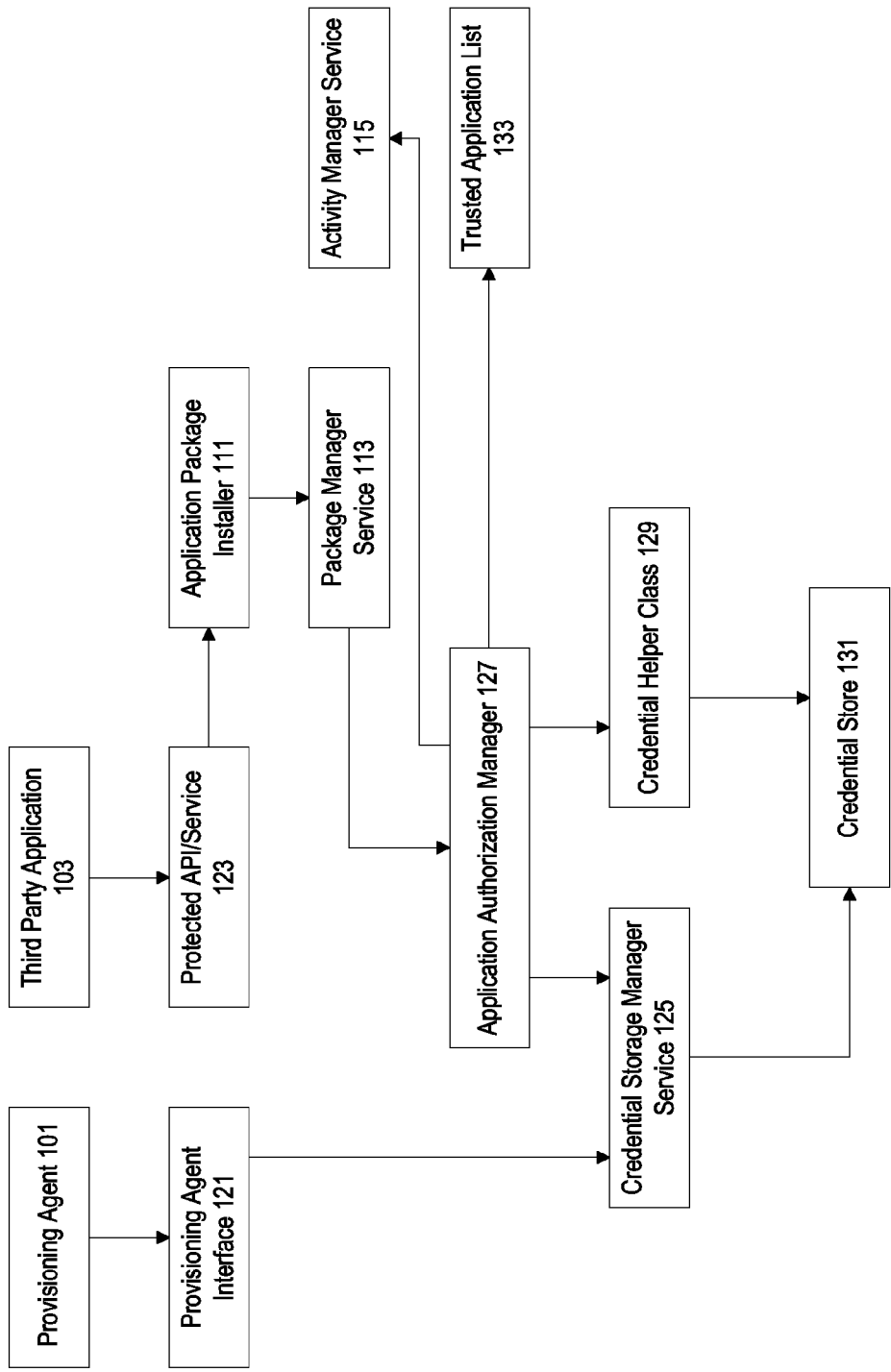
FIG. 1 illustrates a particular system for implementing protected application programming interfaces (APIs).

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular platforms and operating systems. However, it should be noted that the techniques and mechanisms of the present invention apply to a variety of different platforms and operating systems. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Mechanisms are provided to allow particular parties and applications access to protected application programming interfaces (APIs) without the use of security domains. Trusted parties and applications may have access to protected APIs while untrusted parties and applications may be restricted to a more limited set of APIs. Public keys associated with individual applications that are used to enforce licensing policies can be repurposed for use in a verification process to prevent unauthorized access to APIs. A credential storage manager can be used to maintain permission and certificate information. An application authorization manager may access credential storage and maintain trusted application information.

Example Embodiments

Operating systems such as Android™ do not support the concept of security domains. Security domains correlate particular APIs with particular entities and applications. Trusted applications may have access to protected APIs that could compromise user data if misused. System level components may have access to system level APIs that could cause detrimental system operation if misused. Third party applications may be provided only access to particular APIs determined to be low-risk APIs. In some examples, access to low-risk APIs may be provided automatically to any requesting entity, while other higher risk APIs may only be provided to entities and applications in the appropriate security domains.

By contrast, the Android™ platform defines a permission model, which enforces restrictions on what the application can do at run-time, such as access a network, read contacts data, start a service, etc. The application declares the permission it needs in its manifest file. At install time, permissions declared by the application package are verified and granted by the package installer. Permission is granted based on protection level. The four basic permission protection levels defined by Android™ are normal, dangerous, signature, and signature/system. Normal is a low-risk permission automatically granted to a requesting application. Dangerous is a potentially high risk permission that may allow the requesting application access to user private data or direct access to the device. The package installer may request user confirmation before granting this type of permission. Signature is a high risk permission that requires the requesting application to be signed with the same certificate as the application that declared it. Signature/system is a high risk permission that requires that the application requesting the permission be signed with a platform signature. Applications signed with a platform signature are typically built as part of the system image and it is virtually impossible for third party applications to be granted this type of permission.

If a third party application needs to access a protected operation of an API that it does not own, there is no security mechanism to authorize the calling application as a trusted application. By definition, a third party application is typically not signed with the same certificate as the service or API provider, and the third party application is typically not signed with the platform certificate. Normal level permission may always be granted and dangerous level permission is granted as long as the user confirms it. However, none of the Android™ permission protection levels is sufficient to satisfy the use case of a third party application needing to access a protected operation of an API that it does not own.

Consequently, the techniques and mechanisms of the present invention provide an additional protection level for permissions so that certain permissions can be granted based on trusted credentials of the requesting application. This type of permission is referred to as a controlled permission and will be used to protect certain protected APIs. According to various embodiments, a company X may provide certain framework level APIs to a trusted company Y while preventing company Z from accessing those same APIs. A protected API system can also allow certain built-in application package file (APK) related protected operations in an enterprise environment where a device has an enterprise mode and a non-enterprise mode. According to various embodiments, a protected API system determines if an application is authorized to access a particular API by examining the signatures of its APK and verifying that it is derived from a trusted credential. According to various embodiments, an application is trusted if its signature corresponds with that of a listed, pre-authorized application. It should be noted that a trusted credential is not necessarily a trusted certificate or a trusted root certificate and may be an API consumer certificate or API consumer generated certificate. If the application signature corresponds to that of a listed, pre-authorized application, APK installation may proceed and the application may have access to protected APIs.

In addition, whenever a certificate is removed or its association to a controlled permission or privilege operation is removed, a current list of authorized installed APK's is re-evaluated and some APK's may be uninstalled if they are no longer authorized.

According to various embodiments, a protected API system can be used in verification of application signature during package installation, application authorization when a controlled permission is requested, verification of application signature when adding it as an enterprise application where a device supports at least an enterprise mode and at least one other mode, and de-authorization of existing trusted applications when certificates are revoked in the credential store. According to various embodiments, a set of approved certificates are pre-provisioned at the factory. Approved certificates can be added or removed via provisioning sessions. In particular embodiments, revoking the root certificate from which an approved certificate is issued has no effect on application authorization.

FIG. 1 illustrates one particular example of a protected API system. Although the techniques and mechanisms will be described in the context of Android™, it should be noted that the techniques and mechanisms may apply to a variety of platforms and frameworks. According to various embodiments, a package manager service 113 checks for controlled permissions associated with particular APIs during package installations by an application package installer 111. If no controlled permissions are requested, no additional authorization is required. However, if controlled permissions are requested, the package manager service 113 notifies an application authorization manager (AAM) 127. The AAM 127 checks to verify that the application should be granted the necessary permissions. According to various embodiments, the AAM 127 accesses a credential storage manager service (CSM) 125 to determine whether an application certificate corresponds to an entry in a credential store 131.

According to various embodiments, a credential storage manager service 125 can also be connected to a provisioning agent 101 through a provisioning agent interface 121. The credential storage manager service 125 may trigger reauthorization when credentials are changed by a provisioning agent 101. Expiration dates of certificates may also be monitored.

In particular embodiments, the AAM 127 includes APIs for invocation from an Android™ framework and proprietary components. According to various embodiments, the AAM 127 reads a credential store 131 using a credential helper class 129 and maintains a trusted application list 133. In some examples, an AAM 127 can authorize a package for installation if the package is signed with a trusted credential for all controlled permissions that it references in its manifest. If the package is authorized, the package name, the controlled permission names, and the associated credential name is stored in a trusted application list 133 and saved to persistent storage. In particular embodiments, the AAM 127 compares the package signature against credentials for white-listing and if there is a match, this may be stored in a white-list eligibility list. The AAM 127 can also be asked to periodically check if credentials are still valid. If credentials are no longer valid, an application APK may be uninstalled.

According to various embodiments, a credential storage manager (CSM) 125 is an Android™ service that manages a credential store 131 and associated controlled permissions. In particular embodiments, the CSM 125 is the component configured to manage updates to certificates, controlled permissions and associations between certificates, and controlled permissions. In particular embodiments, the CSM implements mechanisms for updates to the credential store, which can be used by a provisioning agent to provision credentials and controlled permissions remotely from a provisioning server. According to various embodiments, the CSM 125 may add or remove a certificate and add or remove controlled permissions.

According to various embodiments, the credential helper 129 implements mechanisms for accessing the credential store 131. In particular embodiments, it is used by the AAM 127 to get lists of certificates and controlled permissions for application authorization. The activity manager server 115 controls execution of activities, services, and content providers. It starts executions of activities, services, and content providers and uses the package manager to verify permissions. It can be used by protected APIs to check controlled permissions at run time.

Figure 2:
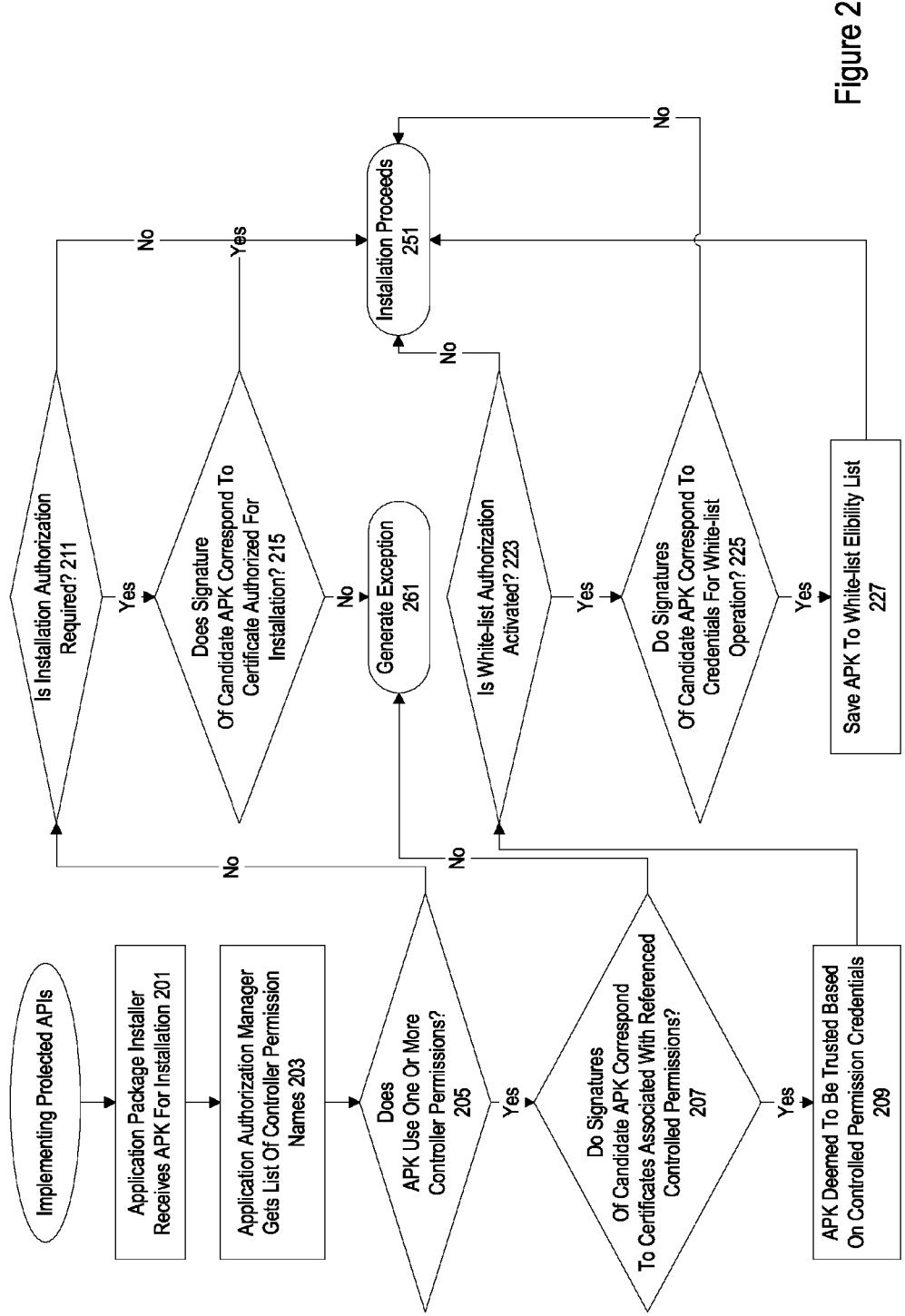
FIG. 2 illustrates a particular example of implementation of protected APIs during application installation.

FIG. 2 illustrates one example of a technique for implementing protected APIs during application package installation. According to various embodiments, an application package installer receives an APK for installation at 201. According to various embodiments, an AAM verifies that APK installation is allowed based on controlled permission credentials and based on install credentials. The AAM also determines whether the APK can be white-listed based on white-list credentials. According to various embodiments, an AAM gets a list of controlled permission names at 203. If the APK uses one or more of the controlled permissions based on its manifest at 205, a list of certificates associated with the referenced controlled permissions is obtained and compared against the signatures of the candidate APK at 207. If a match is found between the signatures of the candidate APK and the certificate list for each reference controlled permission at 207, the APK is deemed to be trusted at 209 and the process proceeds to white-list determination at 221. If a match is not found at 207, an exception is generated and the installation fails at 261 based on controlled permission credentials.

If the APK does not use one or more of the controlled permissions based on its manifest at 205, a provisioning interface is checked to determine if an installation authorization policy is on at 211. If installation authorization is not required, installation can proceed at 251. If installation authorization is required, then a list of certificates for installation is obtained to determine if there is a match between one of the APK signatures and the entries in the list at 215. If there is a match at 215, installation can proceed at 251. Otherwise, installation fails at 261. If it is determined that the APK does not use any of the controlled permissions.

If the APK is deemed to be trusted at 209 based on controlled permission credentials, a provisioning agent is checked to determine if white-list authorization is on at 223. If not, installation proceeds at 251. If white-list authorization is on, a list of credentials for white-list operation is obtained. The list is checked to find a match against signatures of the candidate APK at 225. If a match is found at 225, the APK can be white-listed at 227 and this information is saved in a white-list eligibility list maintained in persistent storage.

Figure 3:
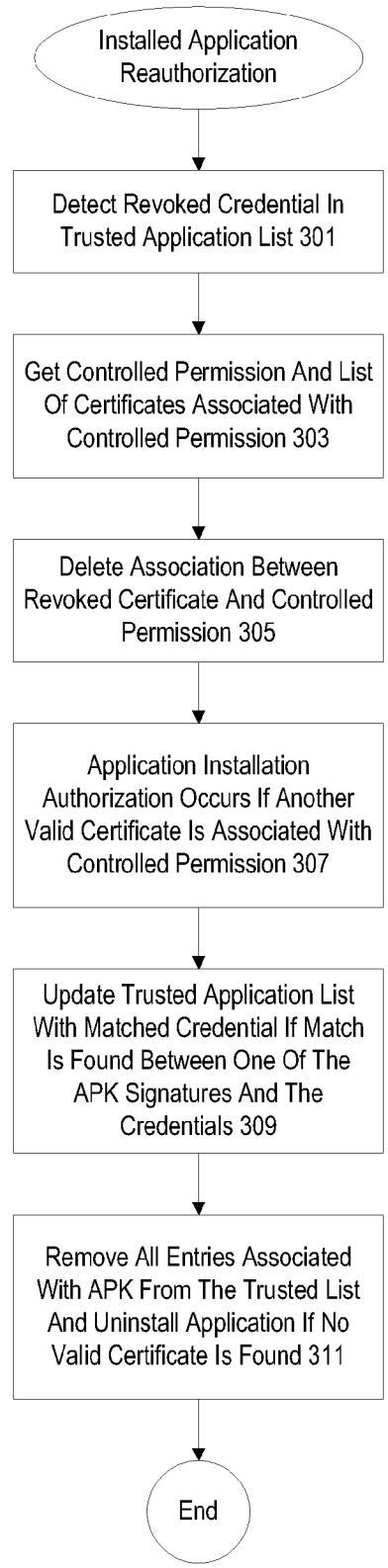
FIG. 3 illustrates a particular example of installed application reauthorization.

FIG. 3 illustrates one example of installed application reauthorization. According to various embodiments, installed application reauthorization may occur in cases where existing certificates are revoked or expire. Certificates can be revoked through a provisioning agent provisioning session, which then sends an Android™ intent indicating such action and affected certificates. In particular embodiments, the AAM implements a broadcast receiver, which then triggers the AAM to scan the list of installed, trusted applications to verify the validity of the credential. This also applies when an association between a certificate and controlled permission is removed, where the controlled permission has more than one certificate associated with it. Additionally, this functionality can be used by a certificate monitor service, which runs periodically to verify expiration of certificates and trigger the AAM to verify its trusted application list accordingly.

According to various embodiments, if the revoked credential is found in the trusted application list at 301, it gets the associated controlled permission and the list of certificates associated with the controlled permission at 303. This includes the built-in permission for "install" and "white-listing" operations. The association between the revoked certificate and controlled permission is deleted at 305.

If there is another valid certificate associated with the controlled permission different from the revoked certificate at 307, it undergoes application installation authorization as shown in FIG. 2. If a match is found between one of the APK signatures and the credentials, it updates the trusted application list with the matched credential at 309.

If a valid certificate is not found, or if match is not found, all entries associated with the APK are removed at 311 from the trusted list and the application is uninstalled since it is no longer trusted. A notification may be posted to the user. If only the "white-listing" credential is not found, the APK is removed from the "white-list eligibility" list but remains installed.

This re-verification interface can be invoked anytime when credentials are updated, or by a service that runs periodically to ensure the credentials have not expired.

Figure 4:
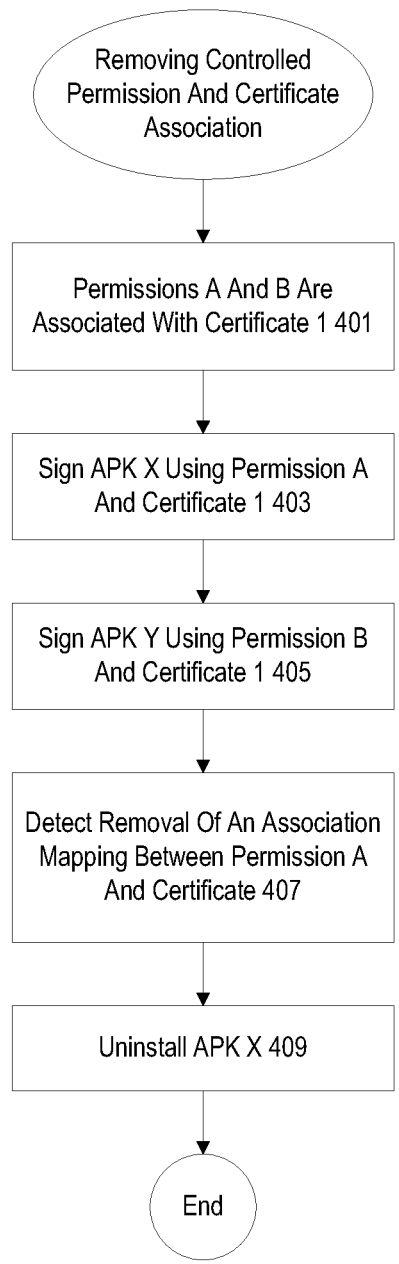
FIG. 4 illustrates a particular example of permission and certificate association.

FIG. 4 illustrates a technique for removing controlled permission and certificate association. This use occurs when a controlled permission's association with a certificate is removed during a provisioning session. The CSM sends an Android™ intent and triggers the AAM to scan the list of installed, trusted applications that use the controlled permission and certificate pair. In one example, permissions A and B are associated with certificate 1 at 401. According to various embodiments, APK X uses permission A and is signed using certificate 1 at 403. In particular embodiments, APK Y uses permission b and is signed also using certificate 1 at 405. In some examples, provisioning removes an association mapping between permission A and certificate 1 at 407. According to various embodiments, APK X would be uninstalled at 409. However, APK Y would remain installed because certificate 1 is still a valid certificate and the mapping between permission B and certificate 1 is still valid.

Figure 5:
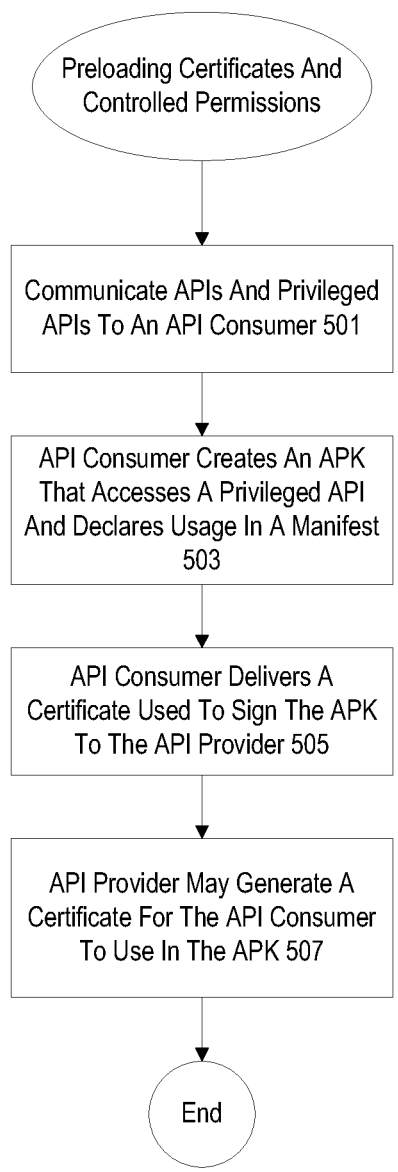
FIG. 5 illustrates a technique for pre-loading certificates and controlled permissions.

FIG. 5 illustrates a technique for pre-loading certificates and controlled permissions. According to various embodiments, a controlled permission configuration file and pre-loaded certificate store will be created at the factory. In particular embodiments, the pre-loaded certificate store contains all preapproved certificates that can be used for controlled permissions. The certificates may be user certificates or certificate authority certificates. According to various embodiments, a configuration file describes the controlled permissions and their association mappings to the certificates.

According to various embodiments, an API provider communicates APIs including protected APIs to an API consumer at 501. In particular embodiments, the API consumer creates an application package or APK that accesses a protected API and declares usage of the protected API in a manifest at 503. According to various embodiments, the API consumer delivers a public key/private, key certificate used to sign the APK to the API provider at 505. The certificate may be the API consumer certificate. Alternatively, an API provider may generate a certificate for the API consumer to use in their APK at 507.

Figure 6:
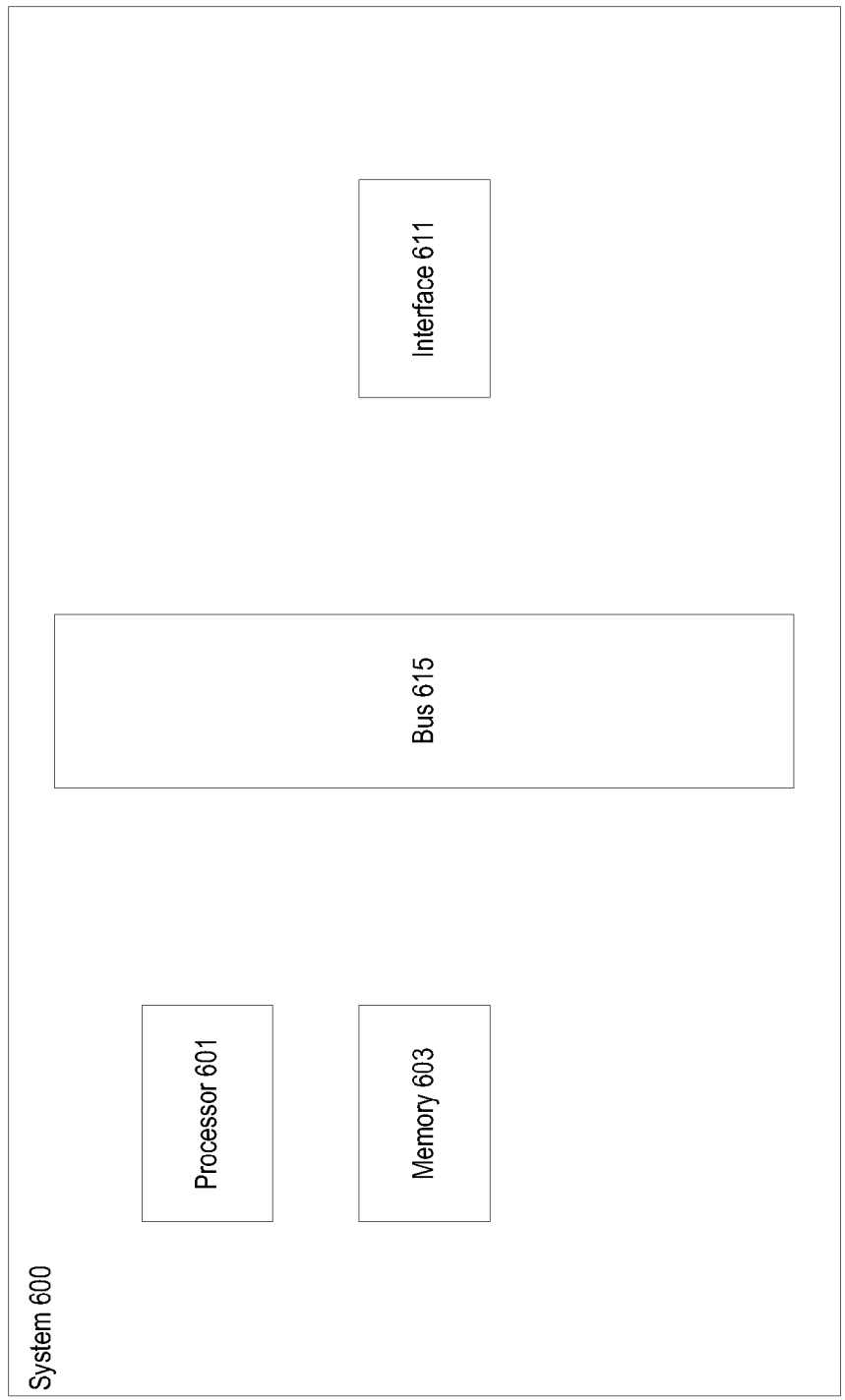
FIG. 6 illustrates a particular example of a computer system.

A variety of devices and applications can implement particular examples of the present invention. FIG. 6 illustrates one example of a computer system. According to particular example embodiments, a system 600 suitable for implementing particular embodiments of the present invention includes a processor 601, a memory 603, an interface 611, and a bus 615 (e.g., a PCI bus). When acting under the control of appropriate software or firmware, the processor 601 is responsible for such tasks such as optimization. Various specially configured devices can also be used in place of a processor 601 or in addition to processor 601. The complete implementation can also be done in custom hardware. The interface 611 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 600 uses memory 603 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc, for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method, comprising:
   receiving an application package for installation on a device;
   determining whether an application associated with the application package uses a protected application programming interface (API), wherein access to the protected API is restricted to applications that have been granted a designated access permission level;
   determining whether an application signature corresponds to a certificate preauthorizing access to the protected API, wherein the certificate preauthorizing access to the protected API indicates the designated access permission level;
   designating the application as trusted based on protected API credentials, wherein the designation of the application as trusted is not based on whether the application resides in a designated security domain;
   determining whether the application signature corresponds to a certificate preauthorizing installation of the application package; and
   proceeding with installation of the application package on the device.

2. The method of claim 1, wherein the protected API is associated with a controlled permission.

3. The method of claim 1, wherein the application signature is a API consumer certificate.

4. The method of claim 1, wherein the application package is received at an application package installer.

5. The method of claim 1, wherein the same application signature is used to authorize installation and access to the protected API.

6. The method of claim 1, wherein an application authorization manager (AAM) accesses a credential storage and maintains trusted application information.

7. The method of claim 1, wherein a credential storage manager (CSM) manages a credential store and associated controlled permissions.

8. The method of claim 7, wherein the CSM is configured to manage updates to certificates, controlled permissions and associations between certificates, and controlled permissions.

9. A system, comprising:
   an application package installer configured to receive an application package for installation on a device;
   an application authorization manager (AAM) connected to the application package installer, the AAM configured to determine whether an application associated with the application package uses a protected application programming interface (API), wherein access to the protected API is restricted to applications that have been granted a designated access permission level; and
   a credential storage manager (CSM) connected to the AAM, the CSM configured to determine whether an application signature corresponds to a certificate preauthorizing access to the protected API and whether the application signature corresponds to a certificate preauthorizing installation of the application package, wherein the application is designated as trusted based on protected API credentials, wherein the designation of the application as trusted is not based on whether the application resides in a designated security domain, wherein the certificate preauthorizing access to the protected API indicates the designated access permission level.

10. The system of claim 9, wherein the protected API is associated with a controlled permission.

11. The system of claim 9, wherein the application signature is a API consumer certificate.

12. The system of claim 9, wherein the application package is received at an application package installer.

13. The system of claim 9, wherein the same application signature is used to authorize installation and access to the protected API.

14. The system of claim 9, wherein the AAM accesses a credential storage and maintains trusted application information.

15. The system of claim 9, wherein the CSM manages a credential store and associated controlled permissions.

16. The system of claim 15, wherein the CSM is configured to manage updates to certificates, controlled permissions and associations between certificates, and controlled permissions.

17. A computer readable storage medium having computer code embodied therein, the computer readable storage medium comprising:
   computer code for receiving an application package for installation on a device;

computer code for determining whether an application associated with the application package uses a protected application programming interface (API), wherein access to the protected API is restricted to applications that have been granted a designated access permission level;

computer code for determining whether an application signature corresponds to a certificate preauthorizing access to the protected API, wherein the certificate preauthorizing access to the protected API indicates the designated access permission level;

computer code for designating the application as trusted based on protected API credentials, wherein the designation of the application as trusted is not based on whether the application resides in a designated security domain;

computer code for determining whether the application signature corresponds to a certificate preauthorizing installation of the application package; and computer code for proceeding with installation of the application package on the device.

18. The computer readable medium of claim 17, wherein the protected API is associated with a controlled permission.

19. The computer readable medium of claim 17, wherein the application signature is a API consumer certificate.

20. The computer readable medium of claim 17, wherein the application package is received at an application package installer.

* * * * *